United States Patent
Li et al.

(10) Patent No.: US 11,243,868 B2
(45) Date of Patent: Feb. 8, 2022

(54) APPLICATION CONTAINERIZATION BASED ON TRACE INFORMATION

(71) Applicant: International Business Machines Corporation, Armonk, NY (US)

(72) Inventors: Guang Cheng Li, Beijing (CN); Qi Ming Teng, Beijing (CN); Yong Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/601,817

(22) Filed: Oct. 15, 2019

(65) Prior Publication Data

US 2021/0109841 A1   Apr. 15, 2021

(51) Int. Cl.
  *G06F 11/36* (2006.01)
  *G06F 8/60* (2018.01)
  *G06F 11/34* (2006.01)

(52) U.S. Cl.
  CPC ...... *G06F 11/3616* (2013.01); *G06F 11/3688* (2013.01); *G06F 8/60* (2013.01)

(58) Field of Classification Search
  CPC .... G06F 11/3616; G06F 11/3688; G06F 8/60; G06F 8/63; G06F 11/3466; G06F 11/302; G06F 2201/815; G06F 2201/865
  See application file for complete search history.

(56) References Cited

U.S. PATENT DOCUMENTS

| 10,210,024 | B2 | 2/2019 | Bhimani |
| 10,628,148 | B1* | 4/2020 | Raikov ..................... G06F 8/60 |
| 2016/0191645 | A1* | 6/2016 | Hayton .............. H04L 67/2842 709/203 |
| 2016/0350081 | A1* | 12/2016 | Kumar ...................... G06F 8/30 |
| 2017/0300697 | A1* | 10/2017 | Iyer ....................... G06F 21/577 |
| 2018/0060740 | A1* | 3/2018 | Bradley ............. G06F 9/45558 |
| 2018/0101371 | A1* | 4/2018 | Flanakin ................... G06F 8/34 |
| 2018/0165071 | A1* | 6/2018 | Raghavan ................. G06F 8/60 |
| 2020/0082095 | A1* | 3/2020 | Mcallister ........... G06F 11/3624 |
| 2020/0089518 | A1* | 3/2020 | Beyer ................... G06F 9/5072 |
| 2020/0272427 | A1* | 8/2020 | Wang .................. G06F 9/45558 |

FOREIGN PATENT DOCUMENTS

WO   2018203635 A1   11/2018

OTHER PUBLICATIONS

Palan, Vineet Haresh, "A Novel Approach to Containerize Existing Applications", Jun. 2018, 91 pages.
(Continued)

*Primary Examiner* — Daxin Wu
(74) *Attorney, Agent, or Firm* — Brian M. Restauro (57) ABSTRACT

The present disclosure provides a computer-implemented method, computer system and computer program product for application containerization. According to the computer-implemented method, an application to be containerized can be traced. Information obtained in the tracing can be analyzed to determine one or more features of the application. An image template for the application can be created based on the one or more features. Then, a container image for the application can be built based on the image template.

20 Claims, 5 Drawing Sheets

(56) References Cited

OTHER PUBLICATIONS

Kulkarni, Swapnil, "An overview of containerizing the existing applications", Published on Nov. 2, 2018, 4 pages, <https://www.linkedin.com/pulse/overview-containerizing-existing-applications-swapnil-kulkarni>.

Borsboom, Emanuel, "Containerizing a legacy application: an overview", Posted Jan. 12, 2017, 11 pages, <https://www.fpcomplete.com/blog/2017/01/containerize-legacy-app>.

Lubin, Eric, "VM2Docker: Automating the Conversion from Virtual Machine to Docker Container", Feb. 2015, © Massachusetts Institute of Technology 2015, 68 pages.

Mell et al., "The NIST Definition of Cloud Computing", Recommendations of the National Institute of Standards and Technology, NIST Special Publication 800-145, Sep. 2011, 7 pages.

* cited by examiner

APPLICATION CONTAINERIZATION BASED ON TRACE INFORMATION

BACKGROUND

The present invention relates to container technologies, and more specifically, to methods, systems, and computer program products for application containerization.

A container is an encapsulated environment that can be used to run applications. Container technologies are becoming widely used in recent years. Many existing workloads may need to be migrated to container environments. Application containerization is a critical step of migration workloads.

SUMMARY

According to one embodiment of the present invention, there is provided a computer-implemented method for application containerization. According to the computer-implemented method, an application to be containerized can be traced. Information obtained in the tracing of the application can be analyzed to determine one or more features of the application. An image template for the application can be created based on the one or more features. Then, a container image for the application can be built based on the image template.

According to another embodiment of the present invention, there is provided a computer system for application containerization. The computer system comprises one or more processors, a computer-readable memory coupled to the one or more processors. The computer-readable memory comprises instructions that when executed by the one or more processors perform actions of: tracing an application to be containerized; analyzing information obtained in the tracing of the application to determine one or more features of the application; creating an image template for the application based on the one or more features; and building a container image for the application based on the image template.

According to another embodiment of the present invention, there is provided a computer program product for application containerization. The computer program product comprises a computer readable storage medium having program instructions embodied therewith, the program instructions executable by a processor to cause the processor to perform actions of: tracing an application to be containerized; analyzing information obtained in the tracing of the application to determine one or more features of the application; creating an image template for the application based on the one or more features; and building a container image for the application based on the image template.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
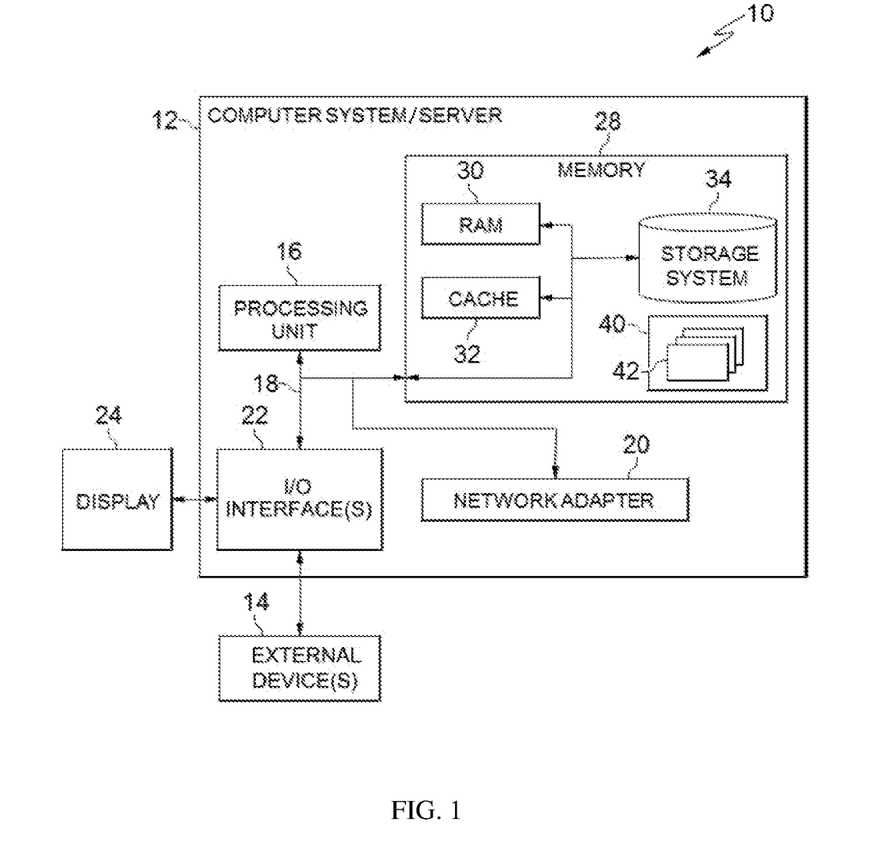
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
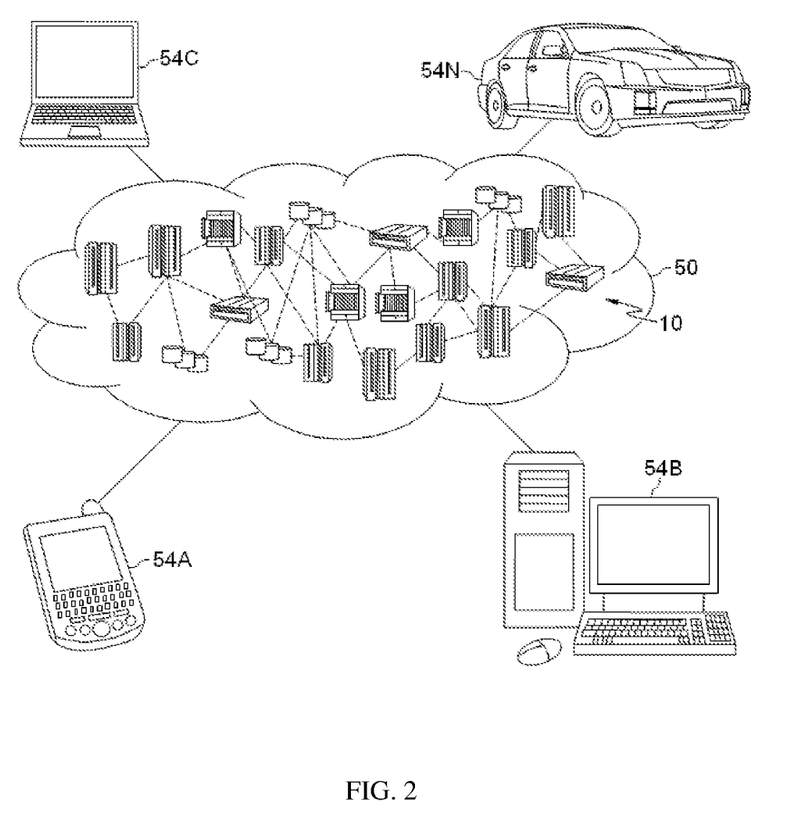
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
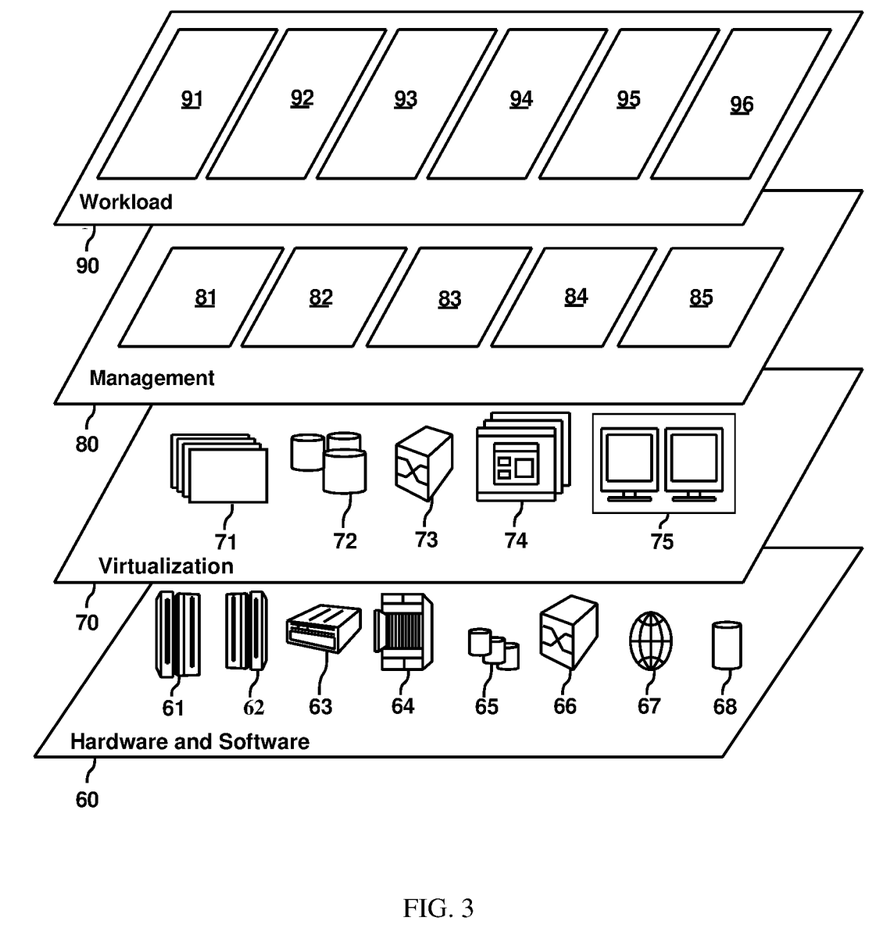
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application containerization 96.

As discussed above, application containerization is an important step when transferring traditional workloads to container environments (such as, a container cloud environment, etc.). Manual application containerization relies on experiences of operators, and it is often time-consuming and error-prone. Embodiments of the present invention provide approaches to containerize applications automatically and efficiently.

Figure 4:
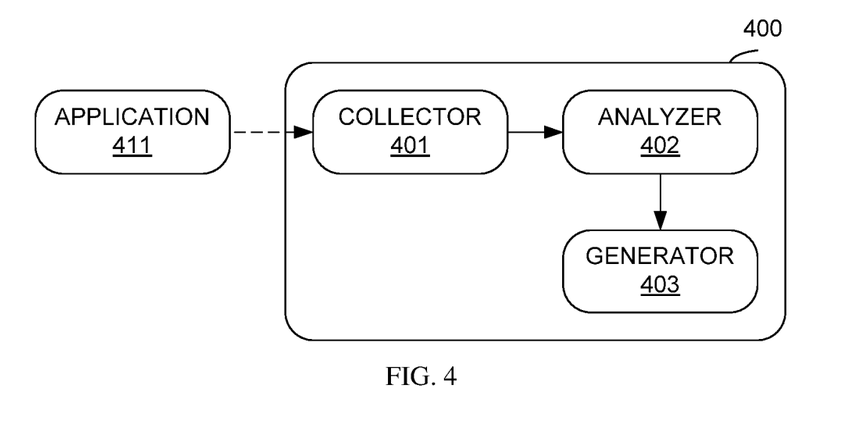
FIG. 4 depicts a schematic diagram of an example application containerization system according to an embodiment of the present invention.

Referring now to FIG. 4, a schematic diagram of an example application containerization system 400 according to an embodiment of the present invention is depicted. The application containerization system 400 can be comprised in or implemented as the computer system/server 12 of FIG. 1. The application containerization system 400 comprises one or more modules, such as, a collector 401, an analyzer 402, and a generator 403. It should be understood that the application containerization system 400 may also comprise one or more modules not shown in FIG. 4. It should also be understood that one or more modules shown in FIG. 4 may be omitted, combined as a single module, or divided into multiple sub modules. The collector 401, the analyzer 402, and the generator 403 can communicate with each other via data connections.

According to embodiments of the present invention, the collector 401 can trace an application 411 to be containerized. The application 411 to be containerized can be an application installed on the computer system/server 12 of FIG. 1 or installed on a separate device outside of the computer system/server 12. The application 411 can also be a service application running on the computer system/server 12 or the separate device. The collector 401 can trace system and application activities related to the application 411 on the computer system/server 12 or the separate device. For example, if the application 411 is installed on the computer system/server 12, the collector 401 can trace activities of the computer system/server 12 and application 411, and the collector 401 can also trace activities of other applications related to the application 411.

In some embodiments, information can be obtained during the tracing by the collector 401. The information obtained during the tracing (referred as trace information hereinafter) may comprise one or more selected from the following group: process running environments, application logging information, file access, binaries invocations, local socket calls, and remote networking calls, etc. It should be understood that the collector 401 can use system commands, trace scripts, or other manners to trace the application 411 to obtain the trace information.

In some embodiments, the collector 401 can trace the application 411 for a preset period. The preset period can be set by the user of the application containerization system 400 to collect enough information for the application 411.

In some other embodiments, the collector 401 can enable a testing of one or more functionalities of the application 411 and collect information by tracing one or more processes of the testing. A testing instruction set, or a testing script can be provided by a user or administrator of the application containerization system 400 to test one or more functionalities of the application 411. For example, if the application 411 to be containerized has three functionalities, a testing script can be generated to test the three functionalities respectively. The testing can be enabled in response to receiving an input from the user or the administrator of the application containerization system 400, wherein the input can indicate selection of the user or the administrator for enabling the testing.

In some other embodiments, the collector 401 can reload the application 411 and trace one ore more processes of the reloading of the application 411. As an example, the trace of the reloading can be implemented through analyzing systemd unit file (which stores, for example, information about a service, a device, a mounting point, and an operation system, etc.) or sending a HUP signal (a kind of signal of the operation system).

According to embodiments of the present invention, the analyzer 402 can analyze the information obtained in the tracing of the application to determine one or more features of the application 411. In some embodiments, the one or more features of the application may comprise one or more selected from the following group: a base image, one or more packages to be installed into an image, one or more files to be copied into the image, files to be removed from the one or more packages, environment variables, ports to expose, and a start command, etc.

In some embodiments, the analyzer 402 can obtain information about the operating system on which the application 411 is running and determine an available base image corresponding to the operating system as a feature of the application 411. Longest prefix matching can be used to search images available on container host and image repository. For example, if the application 411 is running on an operation system ABC:16.04.05, there are three images available (operation system ABC:16.04.05, operation system ABC:16.04, operation system ABC:16.10) on a container host and/or an image repository, operation system ABC:16.04.05 would be a preferred base image and can be used as a feature of the application 411.

In some embodiments, the analyzer 402 can analyze a first file accessed by the application 411 and obtain one or more packages including files of the device on which the application 411 is running. The one or more packages can be found from the device or a separate server which stores packages of files. If the first file matches with a file of a first package of the one or more packages, the analyzer 402 can determine the first package as a feature of the application 411. In this example, the first package can be added to the container image during building the container image. If the first file does not match with any file of the one or more packages, the analyzer 402 can determine the first file as a feature of the application 411, which means the first file will be comprised in the container image to be built. In this example, the first file can be directly copied to the container image during building of the container image.

As an example, for a device with a RedHat® operation system, a command "rpm-qf<filenameA>" can be used to obtain the package which includes the file with a name "filenameA". As a further example, for a device with a Debian® operation system, a command "dpkg-S<filenameB>" can be used to obtain the package which includes the file with a name "filenameB".

In some other embodiments, files not being used by the application 411 in the one or more packages can also be determined by the analyzer 402 based on the analysis of the trace information. These files not being used by the application 411 can also be referred as files to be removed from the one or more packages and therefore can be used by the analyzer 402 as features of the application 411, which means these files will not be comprised in the container image. As an example, after adding one or more packages during building of the container image, these files not being used by the application 411 can be removed from the one or more packages added to the container image.

In some embodiments, the analyzer 402 can analyze information about local socket calls and remote networking calls related to the application 411 to determine external dependency applications, obtain one or more environment variables based on the external dependency applications, and determine the one or more environment variables as features of the application.

As an example, if a first application and a second application are found as external dependency applications of the application 411 through analyzing local socket calls and remote networking calls related to the application 411, one or more environment variables can be set to define the first application and the second application. The one or more environment variables can be included as features of the application 411 and used to create an image template.

In some further embodiments, the analyzer 402 can customize a configuration file based on the external dependency applications and determine the customized configuration file as a feature of the application.

In some embodiments, the analyzer 402 can analyze information about process running environment of the application 411 to determine one or more environment variables, a port to expose and/or a start command, etc. Then, the analyzer 402 can determine the one or more environment variables, the port to expose and/or the start command as features of the application.

According to embodiments of the present invention, an image template for the application 411 can be created by the generator 403 based on the determined one or more features. In some embodiments, the created image template can be used to represent features of the application 411 which can be used to build a container image. The image template may comprise a Dockerfile template, etc. As an example, the created image template may comprise one or more data fields, which may represent the one or more features of the application 411.

Figure 5:
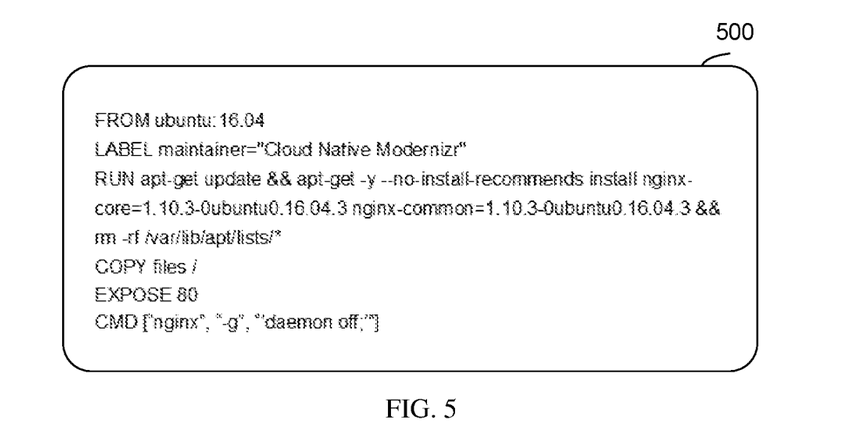
FIG. 5 depicts a schematic diagram of an example Dockerfile template according to an embodiment of the present invention.

Referring now to FIG. 5, a schematic diagram of an example Dockerfile template 500 according to an embodiment of the present invention is depicted. The Dockerfile template corresponds to an application "nginx" to be containerized. Trace information of the application "nginx" is analyzed using the above-mentioned method. One or more features (such as, one or more of a base image, one or more packages to be installed into an image, one or more files to be copied into the image, files to be removed from the one or more packages, environment variables, ports to expose, and a start command, etc.) of the application "nginx" can be determined.

In this example, the base image in the Dockerfile is Ubuntu 16.04, which is a feature of the application "nginx" determined based on the analysis. The RUN instructions comprise "RUN apt-get update && apt-get-y-no-install-recommends install nginx-core=1.10.3-0ubuntu0.16.04.3 nginx-common=1.10.3-0ubuntu0.16.04.3 && rm-rf/var/lib/apt/lists/*", wherein the packages to be installed to the image comprise "nginx-core=1.10.3-0ubuntu0.16.04.3" and "nginx-common=1.10.3-0ubuntu0.16.04.3", which are features of the application "nginx" determined based on the analysis. The COPY instruction comprises "COPY files/", wherein the files to be copied are features of the application "nginx" determined based on the analysis. The port to expose of the application "nginx" is 80, which is a feature of the application "nginx" determined based on the analysis. The command to start is "nginx-g 'daemon off;'", which is also a feature of the application "nginx" determined based on the analysis.

According to embodiments of the present invention, the generator 403 can build a container image for the application 411 using the created image template. The built container image can then be stored on an image registry for future usage. As example, if the created image template is a Dockerfile, the generator 403 can use the command "docker build-t<image_name>-f<Dockerfile_name>" to build the container image based on the created image template.

Figure 6:
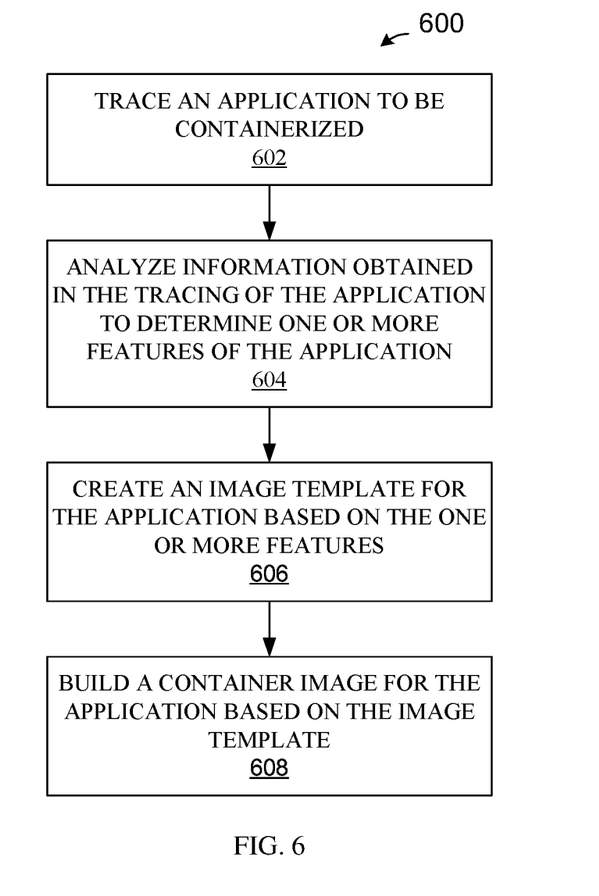
FIG. 6 depicts a flow chart of an example method for application containerization according to an embodiment of the present invention.

With reference to FIG. 6, a method 600 for application containerization is illustrated according to embodiments of the invention. The method 600 can be implemented by the computer system/server 12 of FIG. 1 or a computer node 10 in a cloud system. The method 600 can also be implemented by the application containerization system 400 of FIG. 4. It should be noted that the method 600 is only illustrative and is not intended to suggest any limitation as to the scope of use or functionality of embodiments of the present invention.

At step 602, an application to be containerized can be traced. At step 604, information obtained in the tracing of the application can be analyzed to determine one or more features of the application. At step 606, an image template for the application can be created based on the one or more features. Then, at step 608, a container image for the application can be built based on the image template.

It should be noted that the processing of application containerization according to embodiments of the present invention could be implemented by the computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for application containerization, comprising:

tracing, by one or more processors, an application to be containerized;

analyzing, by one or more processors, information obtained from the tracing of the application to determine one or more features of the application and one or more environment variables based on external dependencies of the application;

creating, by one or more processors, an image template for the application based on the one or more features and the one or more environment variables based on the external dependencies of the application, wherein creating an image template comprises selectively removing one or more external dependencies applications of the application to be included in a container image based features accessed during runtime; and building, by one or more processors, a respective container image for the application based on the created image template.

2. The computer-implemented method of claim 1, wherein tracing the application to be containerized further comprises:

enabling, by one or more processors, a testing of one or more functionalities of the application; and tracing, by one or more processors, one or more processes of the testing.

3. The computer-implemented method of claim 1, wherein tracing the application to be containerized further comprises:

reloading, by one or more processors, the application; and tracing, by one or more processors, one or more processes of the reloading.

4. The computer-implemented method of claim 1, wherein the information obtained from the tracing of the application comprises one or more selected from a following group: information about an operation system, information about process running environments, application logging information, file access information, binaries invocations, local socket calls, and remote networking calls.

5. The computer-implemented method of claim 1, wherein the one or more features of the application comprise one or more selected from a following group: a base image, one or more packages to be installed into an image, one or more files to be copied into the image, files to be removed from the one or more packages, environment variables, ports to expose, and a start command.

6. The computer-implemented method of claim 1, wherein analyzing the information obtained in the tracing of the application to determine the one or more features of the application further comprises:

analyzing, by one or more processors, information about an operation system on which the application is running;

selecting, by one or more processors, a base image corresponding to the operation system; and determining, by one or more processors, the base image as a feature of the application.

7. The computer-implemented method of claim 1, wherein analyzing the information obtained in the tracing of the application to determine the one or more features of the application further comprises:

analyzing, by one or more processors, a first file accessed by the application;

obtaining, by one or more processors, one or more packages including files of a computer device on which the application is running;

determining, by one or more processors, a first package of the one or more packages as a feature of the application in response to the first file mapping with a file of the first package; and determining, by one or more processors, the first file as a feature of the application in response to the first file not mapping with any file of the one or more packages.

8. The computer-implemented method of claim 1, wherein analyzing the information obtained in the tracing of the application to determine the one or more features of the application further comprises:

analyzing, by one or more processors, local socket calls and remote networking calls related to the application to determine one or more external dependency applications;

obtaining, by one or more processor, one or more environment variables based on the one or more external dependency applications; and determining, by one or more processors, the one or more environment variables as one or more features of the application.

9. The computer-implemented method of claim 8, further comprising:

customizing, by or more processors, a configuration file based on the external dependency applications; and determining, by one or more processors, the customized configuration file as a feature of the application.

10. The computer-implemented method of claim 1, wherein the analyzing the information obtained in the tracing of the application to determine the one or more features of the application further comprises:

analyzing, by one or more processors, information about process running environment of the application to determine one or more environment variables, a port to expose and/or a start command; and determining, by one or more processors, the one or more environment variables, the port to expose and/or the start command as features of the application.

11. The computer-implemented method of claim 1, the created image template comprises a Dockerfile template.

12. A computer system for application containerization, comprising:

one or more processors;

a computer-readable memory coupled to the processors, the computer-readable memory comprising instructions that when executed by the processors perform actions of:

tracing an application to be containerized;

analyzing information obtained in the tracing of the application to determine one or more features of the application and one or more environment variables based on external dependencies of the application;

creating an image template for the application based on the one or more features and the one or more environment variables based on the external dependencies of the application, wherein creating an image template comprises selectively removing one or more external dependencies applications of the application to be included in a container image based features accessed during runtime; and building a respective container image for the application based on the created image template.

13. The computer system of claim 12, wherein tracing the application to be containerized further comprises:

enabling a testing of one or more functionalities of the application; and tracing one or more processes of the testing.

14. The computer system of claim 12, wherein tracing the application to be containerized further comprises:

reloading the application; and tracing one or more processes of the reloading.

15. The computer system of claim 12, wherein the information obtained in the tracing comprises one or more selected from a following group: information about an operation system, information about process running environments, application logging information, file access information, binaries invocations, local socket calls, and remote networking calls.

16. The computer system of claim 12, wherein the one or more features of the application comprise one or more selected from a following group: a base image, one or more packages to be installed into an image, one or more files to be copied into the image, files to be removed from the one or more packages, environment variables, ports to expose, and a start command.

17. A computer program product, comprising a computer readable storage medium having program instructions embodied therewith, the program instructions executable by a processor to cause the processor to perform actions of:

tracing an application to be containerized;

analyzing information obtained in the tracing of the application to determine one or more features of the application and one or more environment variables based on external dependencies of the application;

creating an image template for the application based on the one or more features and the one or more environment variables based on the external dependencies of the application, wherein creating an image template comprises selectively removing one or more external dependencies applications of the application to be included in a container image based features accessed during runtime; and building a respective container image for the application based on the created image template.

18. The computer program product of claim 17, wherein tracing the application to be containerized further comprises:

enabling a testing of one or more functionalities of the application; and tracing one or more processes of the testing.

19. The computer program product of claim 17, wherein tracing the application to be containerized further comprises:

reloading the application; and tracing one or more processes of the reloading.

20. The computer program product of claim 17, wherein the information obtained in the tracing comprises one or more selected from the following group: information about an operation system, information about process running environments, application logging information, file access information, binaries invocations, local socket calls, and remote networking calls.

* * * * *